No. 849,746. PATENTED APR. 9, 1907.
B. ODEGARD.
TOBACCO PIPE.
APPLICATION FILED MAR. 17, 1906.

Witnesses:
Chas. F. Bassett
M. A. Milord

Inventor
Bertram Odegard
By Frederick Benjamin
Atty.

UNITED STATES PATENT OFFICE.

BERTRAM ODEGARD, OF CHICAGO, ILLINOIS.

TOBACCO-PIPE.

No. 849,746.　　　　　Specification of Letters Patent.　　　Patented April 9, 1907.

Application filed March 17, 1906. Serial No. 306,572.

*To all whom it may concern:*

Be it known that I, BERTRAM ODEGARD, a citizen of the United States, residing at Chicago, in the county of Cook and State of Illinois, have invented certain new and useful Improvements in Tobacco-Pipes, of which the following is a specification.

This invention relates to improvements in smokers' tobacco-pipes; and the especial object of the improvements which form the subject-matter of this application is to produce a pipe that can be cheaply manufactured, that will afford a cool smoke, and that can be thoroughly and easily cleaned. In carrying out this and other objects of general utility I have invented the pipe or pipe-stem shown in a preferred form in the accompanying drawings, which form a part of this application.

Figure 1:
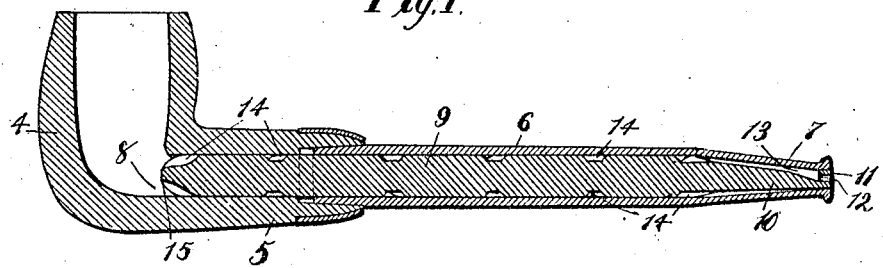
Figure 2:
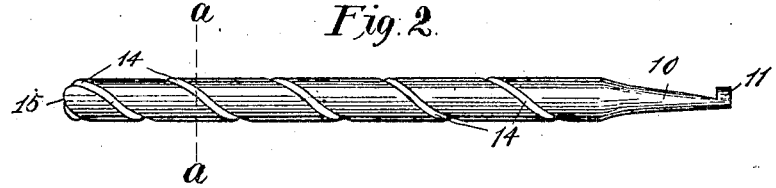
Figure 3:
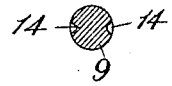

In said drawings, Figure 1 is a longitudinal section through a complete pipe made according to my invention. Fig. 2 is a longitudinal elevation of one element of the pipe-stem, and Fig. 3 is a cross-section on the line *a a* of Fig. 2.

Referring to the details of the drawings, 4 represents a pipe-bowl having a neck 5 of ordinary construction and made of any suitable material. The stem, which is the novel feature of the within-described pipe, consists of a metal non-perforate core 9, in the surface of which is cut two spiral grooves 14, which are formed in parallel helices and extend from the inner end 15 to the tapered outer end 10 of the core. The core, as shown in the drawings, is straight; but it will be apparent that it may be curved, if desired, without altering its functions, and preferably it is made from aluminium. This core is inserted in the neck 5 of the pipe-bowl, so that the end of the core registers with the opening 8 from the neck into the bowl, thus allowing the grooves 14 to communicate with the opening 8. Surrounding the core for the greater portion of its length and forming the other member of the stem is a cylindrical sleeve 6, which may be made of hard rubber or any other suitable material. In the outer end of the sleeve is a hole which receives with a close fit the outer end 11 of the core 9, in which a hole 12 is formed. The core is tapered from the outer end of the grooves 14 to the hole 12, as at 10, and the cross-diameter of the taper is less than the cross-diameter of the corresponding portion of the sleeve, thus leaving an annular space 13 around the tapered end, through which communication is had from the hole 12 to the outer ends of the grooves 14.

The outer end of the neck 5 is enlarged sufficiently to receive the inner end of the sleeve 6 with a tight fit, thus holding the sleeve and core in proper relation to the pipe-bowl and at the same time permitting it to be removed for the purpose of cleaning.

It will be noted that the end 11 of the core fits closely the hole in the outer end of the sleeve and that the tapered portion of the core is cut so that the end of the latter forms a shoulder or hook portion through which the hole 12 extends.

In cleaning a pipe constructed according to my invention the sleeve and core which constitute the stem may be entirely removed from the pipe and the core withdrawn from the sleeve, whereupon a cloth may be used to wipe off any matter deposited in the spiral grooves 14, which, as will be seen, are entirely on the surface of the core, and therefore readily accessible. As the core is withdrawn from the sleeve the end 11 will tend to remove any matter deposited in the channel 13, and as the cross-diameter of the sleeve is relatively large it is an easy matter to clean out said sleeve should any deposits be left in its inner walls. As the core fits closely the sleeve for the greater part of its length, it will be apparent that by turning the sleeve on the core any deposits on the walls of the sleeve will be pushed into the grooves, and thus may be cleaned when the core is removed.

The smoke traversing the relatively long distance represented by the grooves 14 becomes more or less cooled, and thus makes a more comfortable smoke than would be the case if it came direct or in a straight line from the bowl. I am aware that pipe-stems have been patented in which a spiral groove has been formed on one member of the stem; but so far as I know such grooves have been in combination with a bore or central opening through said member, thus failing to eliminate the principal objection to a pipe-stem, which is the difficulty of cleaning out a contracted bore.

Having thus described my invention, what I claim as new is—

1. In a pipe, the combination with a pipe-bowl, of an imperforate core removably fitting said bowl, said core having a stem portion reduced in cross-diameter, and having spiral grooves in its exterior extending from the inner end to the stem, said stem being without grooves and having a perforated shoulder on its outer end, a sleeve removably fitting said bowl and surrounding said core for the greater part of its length and forming a smoke-channel around the reduced portion of said core, the outer end of said sleeve fitting closely the shoulder on the outer end of the stem.

2. In a pipe, the combination with a pipe-bowl, of an imperforate core removably fitting said bowl, said core having spiral grooves in its exterior communicating directly with the interior of the bowl, a sleeve removably fitting said bowl and core and forming the outer walls for the grooves of the core, said sleeve having an opening in its outer end and said core having a perforated and shouldered stem fitting said opening and said sleeve having a smoke-chamber surrounding the said stem.

In testimony whereof I affix my signature in presence of two witnesses.

BERTRAM ODEGARD.

Witnesses:
F. BENJAMIN,
M. A. MILORD.